United States Patent
Sue et al.

(10) Patent No.: US 8,687,210 B2
(45) Date of Patent: Apr. 1, 2014

(54) DOCUMENT DATA ACCESS

(75) Inventors: Brian Sue, Markham (CA); Paul Alexander Walker, Innisfil (CA); William Davis, Toronto (CA); William Morris Guthrie, Jr., Dallas, TX (US); Jason Bryant Weathersby, Inman, SC (US); Richard James Seabright, Oshawa (CA)

(73) Assignee: Actuate Corporation, San Mateo, CA (US)

( * ) Notice: Subject to any disclaimer, the term of this patent is extended or adjusted under 35 U.S.C. 154(b) by 328 days.

(21) Appl. No.: 13/107,723

(22) Filed: May 13, 2011

(65) Prior Publication Data

US 2011/0249286 A1 Oct. 13, 2011

Related U.S. Application Data

(63) Continuation-in-part of application No. 13/045,347, filed on Mar. 10, 2011.

(60) Provisional application No. 60/322,774, filed on Apr. 9, 2010.

(51) Int. Cl.
*G06F 15/00* (2006.01)

(52) U.S. Cl.
USPC .......................................................... 358/1.13

(58) Field of Classification Search
USPC .......................................................... 358/1.13
See application file for complete search history.

(56) References Cited

U.S. PATENT DOCUMENTS

2005/0125728 A1* 6/2005 Peiro et al. .................... 715/523

OTHER PUBLICATIONS

U.S. Appl. No. 13/045,347, filed Mar. 20, 2011, Seabright et al.
Ganza, Peter; "What's in a name?", http://pganza.wordpress.com Mar. 22, 2010; 5 pages.
Assistive Technology, http://www.usft.com/article/Assistive-technology, 2 pages.

* cited by examiner

*Primary Examiner* — Saeid Ebrahimi Dehkordy
(74) *Attorney, Agent, or Firm* — Weaver Austin Villeneuve & Sampson LLP

(57) ABSTRACT

Disclosed are methods and apparatus for accessing data from electronic documents stored as print streams are disclosed. In one embodiment, an electronic document conforming to one of a plurality of print formats is obtained. The electronic document is parsed according to the one of the plurality of print formats to generate an intermediate data structure conforming to an intermediate format such that the electronic document is converted to the intermediate format, wherein the intermediate format is different from the plurality of print formats. One or more rules are applied to obtain data for a plurality of regions of the electronic document from the intermediate data structure. The data for the plurality of regions of the electronic document that has been obtained from the intermediate data structure is stored or provided, thereby enabling a report to be generated using at least a portion of the data for the plurality of regions that has been stored or provided.

32 Claims, 11 Drawing Sheets

DOCUMENT DATA ACCESS

RELATED APPLICATIONS

This application is a Continuation-In-Part and claims priority from U.S. patent application Ser. No. 13/045,347, entitled "AUTOMATED ASSISTIVE TECHNOLOGY FOR THE VISUALLY IMPAIRED," by Richard Seabright et al, filed on Mar. 10, 2011, which is incorporated herein by reference for all purposes and which claims priority from U.S. Provisional Patent Application No. 61/322,774, entitled "ASSISTIVE TECHNOLOGY FOR THE VISUALLY IMPAIRED," by Richard Seabright et al, filed on Apr. 9, 2010.

BACKGROUND OF THE INVENTION

Many businesses print and mail documents to customers on a periodic basis. For example, account statements are often generated on a monthly, quarterly, or yearly basis. Account statements such as credit card statements typically summarize customer account activity occurring during the period of time covered by the statements.

Given the large number of customers that are served by a particular business, the amount of customer data that is stored over time can be voluminous and unwieldy. As a result, businesses often maintain the customer data for a limited period of time after which the data is purged from storage. As a result, the data associated with any given customer is typically available only for the limited period of time during which the data is stored.

SUMMARY OF THE INVENTION

The disclosed embodiments support the generation of reports based, at least in part, upon information stored as a "print stream" suitable for printing by a printer supporting a particular print format. This may be accomplished through accessing documents stored as print streams on a per-document basis, or as a batch process such that a plurality of documents are converted simultaneously.

In accordance with one aspect, documents such as electronic statements stored in various print formats may be accessed for use in generating reports. More particularly, when an electronic document such as an electronic statement is obtained, the format of the electronic document may be identified as one of a plurality of print formats. A plurality of parsers may be available for parsing documents of any of the plurality of print formats. Therefore, a parser corresponding to the identified one of the plurality of formats may be applied such that the electronic document is parsed according to the print format of the electronic document. More particularly, the electronic document may be parsed to identify a plurality of regions of the electronic document.

In accordance with yet another aspect, an intermediate document or data structure that conforms to an intermediate format may be generated based upon results obtained from applying the parser. More particularly, an intermediate document or data structure identifying each of the plurality of regions of the electronic document and including information (e.g., data) for each of the plurality of regions may be generated. The information for each of the plurality of regions may include data (e.g., text) obtained from each of the plurality of fields/regions of the initial electronic document. The information may also indicate the order of the plurality of regions in the electronic document, placement of the plurality of regions within the electronic document, and/or formatting information such as font, font color, etc.

In accordance with yet another aspect, one or more rules may be applied to obtain data for at least a subset of the regions of the electronic document from the intermediate data structure. The data for the subset of the regions of the electronic document that has been obtained from the intermediate data structure may be stored and/or provided (e.g., transmitted) in one or more files or data structures, thereby enabling a report to be generated using at least a portion of the data in the files or data structures. More particularly, the data for the subset of the regions of the electronic document may be stored or provided in corresponding elements of a data structure. Therefore, the data structure may be stored and/or transmitted to an application such as a report generation module.

In accordance with yet another aspect, a virtual data source may be configured to enable electronic documents conforming to a print format to be accessed. More particularly, the virtual data source may provide direct access to file(s) and/or data structure(s) storing data retrieved from the electronic documents. Alternatively, the virtual data source may identify a process (e.g., computer-readable instructions) for retrieving data from the electronic documents and generating one or more files/data structures that store the retrieved data. Furthermore, a set of fields of the virtual data source may be presented to the user for use in report generation. In this manner, a user may generate a report from the virtual data source, thereby appearing to the user that the data is being accessed from a single data source rather than multiple electronic documents conforming to a print stream format.

DETAILED DESCRIPTION OF THE SPECIFIC EMBODIMENTS

Reference will now be made in detail to specific embodiments of the invention. Examples of these embodiments are illustrated in the accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known process operations have not been described in detail in order not to unnecessarily obscure the present invention.

In the following description, the term document may be used to describe an electronic document. Each electronic document may be stored in the form of a file or data structure. An electronic document may represent a physical document that may be printed or displayed via a suitable medium (e.g., printer or display). Examples of such documents include statements (e.g., bills), books, magazines, newspapers, or articles. The document may include text and/or images (e.g., graphics, photographs, logos, etc.). In addition, the document may include formatting information such as font characteristics (e.g., font size, bold, italics, underline, color, etc.).

Figure 1:
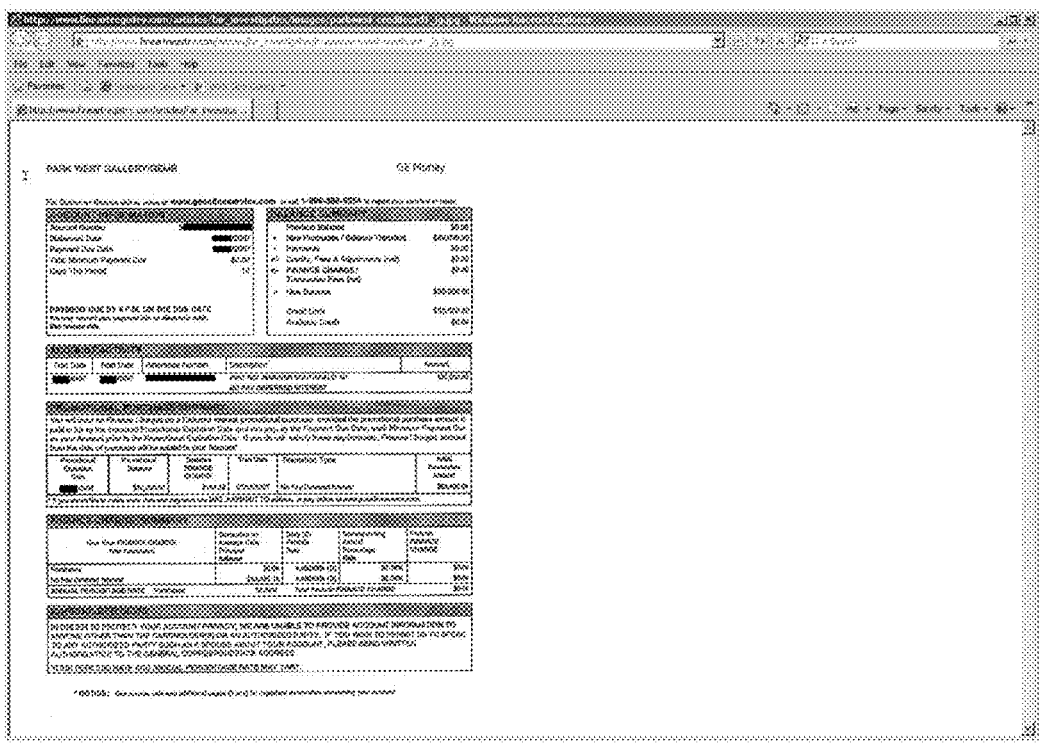
FIG. 1 is a diagram illustrating an example electronic statement that may be accessed for use in generating a report in accordance with various embodiments.

FIG. 1 is a diagram illustrating an example electronic statement that may be accessed for use in generating a report in accordance with various embodiments. As shown in this example, an electronic statement may include information pertaining to an account of a particular customer of a business such as a financial institution or utility company. The electronic statement may include information compiled over a particular period of time, such as a month, quarter, year, or period of years. Examples of electronic statements include financial statements and bills.

As shown in FIG. 1, an electronic statement such as a credit card bill may include Account Information, a Balance Summary, Account Activity, a Promotional Purchase Summary, and/or a Finance Charge Summary. More particularly, the Account Information may include an Account Number, a Statement Date, a Payment Due Date, and/or a Total Minimum Payment Due. In addition, the Balance Summary may include a Previous Balance, New Purchases/Balance Transfers amount, amount of Payment(s), Credits, Fees & Adjustments (net), Finance Charge/Transaction Fees (net) amount, New Balance, Credit Limit, and/or Available Credit. The Account Activity may include information for one or more line items. More particularly, each line item may include a Transaction Date, Post Date, Reference Number, Description of the transaction, and/or Amount of the transaction. The Promotional Purchase Summary may include a Promotional Expiration Date, Promotional Balance, Deferred Finance Charge, Transaction Date, Promotion Type, and/or Initial Transaction Amount. The Finance Charge Summary may include information for Purchases and Deferred Interest, as well as an Annual Percentage Rate and/or Total Periodic Finance charge. The Information for Purchases and Deferred Interest may each include a corresponding Computed on Average Daily Principal Balance, Daily Periodic Rate, Corresponding Annual Percentage Rate, and/or Periodic Finance Charge.

Companies often implement high volume printing to efficiently print statements to be mailed to customers on a periodic basis. Unfortunately, many companies periodically delete information from which electronic statements are compiled. As a result, the electronic statements represent unique sources of information from which the information may not otherwise be obtained.

Since the electronic statements are typically used to generate printed statements, the electronic statements are often generated and saved as a print stream in one of a plurality of print formats. Example print formats include, but are not limited to, Advanced Function Printing (AFP), Line Data, Metacode, Printer Command Language (PCL), and Portable Document Format (PDF). Information saved in a particular print format is designed to be interpreted by a printer operating in accordance with the particular print format. While information saved as a print stream is easily interpreted by a printer, a print stream is difficult to interpret by an individual attempting to decipher the print stream. As a result, information saved in the form of print streams has not traditionally been accessed for purposes of report generation. As will be described in further detail below, the disclosed embodiments enable information compiled in electronic statements to be leveraged for use in reporting systems.

In accordance with various embodiments, a composition engine may generate a single file (e.g., print stream) including a plurality of electronic documents. The file may therefore be processed to identify individual documents based upon one or more logic conditions. In this manner, the file may be "broken" into separate, individual documents. In order to facilitate retrieval of individual documents, the separate documents may be indexed according to various criteria such as date, account number, etc. Each individual electronic document may be processed as described in further detail below with reference to FIG. 2.

Figure 2:
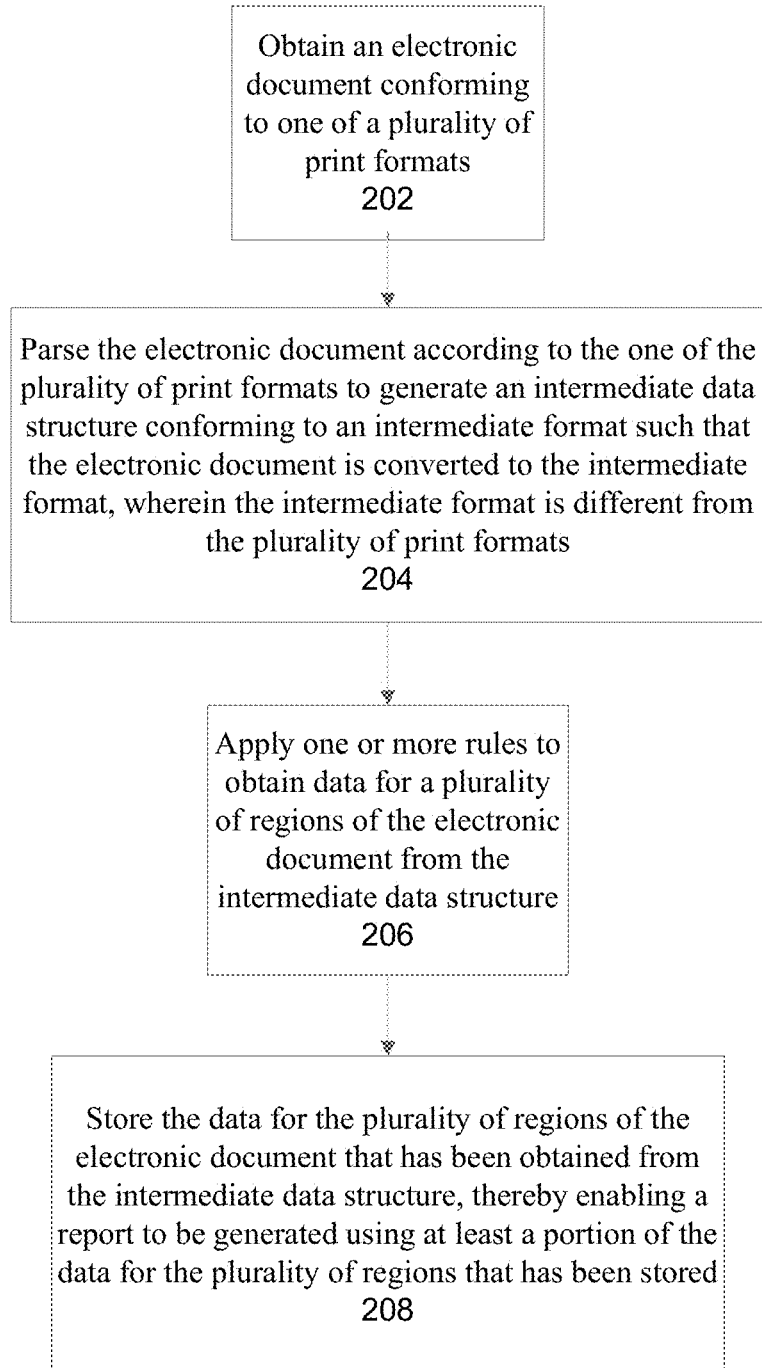
FIG. 2 is a process flow diagram illustrating an example method of retrieving data from an electronic statement for use in report generation in accordance with various embodiments.

FIG. 2 is a process flow diagram illustrating an example method of retrieving data from an electronic statement for use in report generation in accordance with various embodiments. As shown in FIG. 2, an electronic document (e.g., electronic statement) conforming to one of a plurality of print formats may be obtained at 202. More particularly, one of the plurality of print formats to which the electronic document conforms may be identified automatically, or in response to input from a user (e.g., developer or Information Technology professional). For example, during a prior configuration process, the system may receive a selection of one of the plurality of print formats.

The electronic document may be parsed according to the one of the plurality of print formats at 204 to generate an intermediate data structure conforming to an intermediate format such that the electronic document is converted to the intermediate format, where the intermediate format is different from the plurality of print formats. Parsing may be performed by applying one of a plurality of parsers to parse the electronic document, wherein the one of the plurality of parsers is configured to parse documents in the one of the plurality of print formats. Each of the plurality of parsers may be configured to parse documents in a different one of the plurality of print formats. Accordingly, the intermediate data structure may store information obtained by the one of the plurality of parsers.

In one embodiment, one of the plurality of parsers parses the electronic document in order to identify or define a number of regions (i.e., sections) within the electronic document.

In this manner, the logical structure of the document may be identified. For example, the regions that are identified may include specific fields, rows, or columns within the electronic document. Examples of regions that may be identified for an electronic statement such as a bill include a title, due date of a bill, an amount due, a name of the individual to which the bill is addressed, an account number, an address of the individual to which the bill is addressed, and/or one or more line items/rows including text describing an item billed and a corresponding amount billed for the item. The identification of a row as a line item may be accomplished despite the variations in size or height of the rows. The regions may be defined by the name of one or more field(s) within the regions. In addition, one or more of the regions may be defined by a location and/or physical dimensions of the region within the initial document. Moreover, each of the regions may be defined by a rectangular area or a border surrounding the region. In this manner, content from each of the identified regions may be extracted.

The extracted content may be used to generate an intermediate data structure in the intermediate format. For example, the region names and/or content within the regions may be stored in an intermediate data structure. Locations and/or dimensions of various regions within the electronic document may also be preserved in the intermediate data structure, enabling regions to be identified by their locations and/or dimensions within the intermediate data structure. Therefore, the intermediate data structure may indicate a static or floating location for each one of the regions. In this manner, an intermediate data structure including the plurality of regions may be generated.

Once information from the electronic document has been saved in an intermediate data structure in an intermediate format, one or more rules (i.e., locators) may be applied at 206 to obtain data for a plurality of regions of the electronic document from the intermediate data structure. As a result, the rules may be applied regardless of the print format in which the electronic document was generated. More particularly, each of the rules may identify a particular corresponding region of the electronic document. For example, a region may include a particular field, column, row, or physical region (e.g., logo or image). Each rule may identify a region by name (e.g., Account number, Customer Name), coordinates (e.g., vertical and horizontal coordinates) and/or dimensions. In this manner, each of the one or more rules may indicate or identify a static or floating location in the electronic document at which data is to be obtained for a corresponding one of the plurality of regions. Therefore, by applying one or more rules, a plurality of regions of the electronic document may be identified in the intermediate data structure, enabling data to be obtained for the plurality of regions from the intermediate data structure.

The data for the plurality of regions of the electronic document that has been obtained from the intermediate data structure may be stored at 208, thereby enabling a report to be generated using at least a portion of the data for the plurality of regions. For example, the data for the plurality of regions of the electronic document may be stored in the form of a file or data structure, as will be described in further detail below. In this manner, information from a set of one or more electronic documents may be stored. Alternatively, rather than storing the data that has been obtained from the intermediate data structure, the data may be provided to (e.g., transmitted to) or directly accessed by an application such as a report generation module responsible for report generation. In other words, the data that has been obtained need not be stored in memory in order to support report generation using the data.

In accordance with various embodiments, a document data structure is generated for an electronic document and data for the plurality of regions of the electronic document is stored or provided in the document data structure. In this manner, a document data structure may be used to store data originally obtained from a single electronic document (e.g., statement) and/or the document data structure may be used to support communication of the data (or portion thereof) that has been obtained to an application such as a report generation module. Thus, each electronic statement may be represented by a different document data structure. As a result, a plurality of document data structures may be generated for a plurality of electronic statements, where each of the plurality of document data structures stores data obtained for the plurality of regions from a different one of the plurality of electronic statements. More particularly, each document data structure may be implemented in a language such as Extensible Markup Language (XML). Data may be retrieved from the document data structure for one or more document data structures for generation of a report. More particularly, the document data structure for each of one or more electronic documents may be provided to a report generation module, or may be accessed directly by the report generation module. A report generation module associated with a report generation tool may identify criteria for selecting a set of electronic documents (e.g., based upon a user query), as well as identify a subset of the plurality of regions (e.g., fields), as pertinent to a report design. In this manner, the report generation tool may identify a set of documents, as well as a subset of the plurality of regions for which data is desired for generation of a report from a report design. The pertinent documents may be identified and retrieved based upon one or more indexing parameters (e.g., date, account number and/or name) where the corresponding document data structures have not already been generated. The report generation tool may directly access the document data structure for a particular electronic document. Alternatively, the report generation module may transmit a request to obtain data for the subset of the plurality of regions for the set of documents, where the request identifies the subset of the plurality of regions that are pertinent to the report design. Upon receiving the request, data for the subset of the plurality of regions may be retrieved from the document data structure for one or more documents. This data may then be provided to the report generation module. The report generation module may then generate a report using at least a portion of the data that has been retrieved in response to the request.

In accordance with various embodiments, data obtained from the document data structure may be stored in a file or database. In this manner, a single file or database may store data for one or more electronic documents. Alternatively, data from a document data structure may be stored as a single data object, resulting in the storage of a plurality of data objects corresponding to a plurality of electronic documents.

Figure 3:
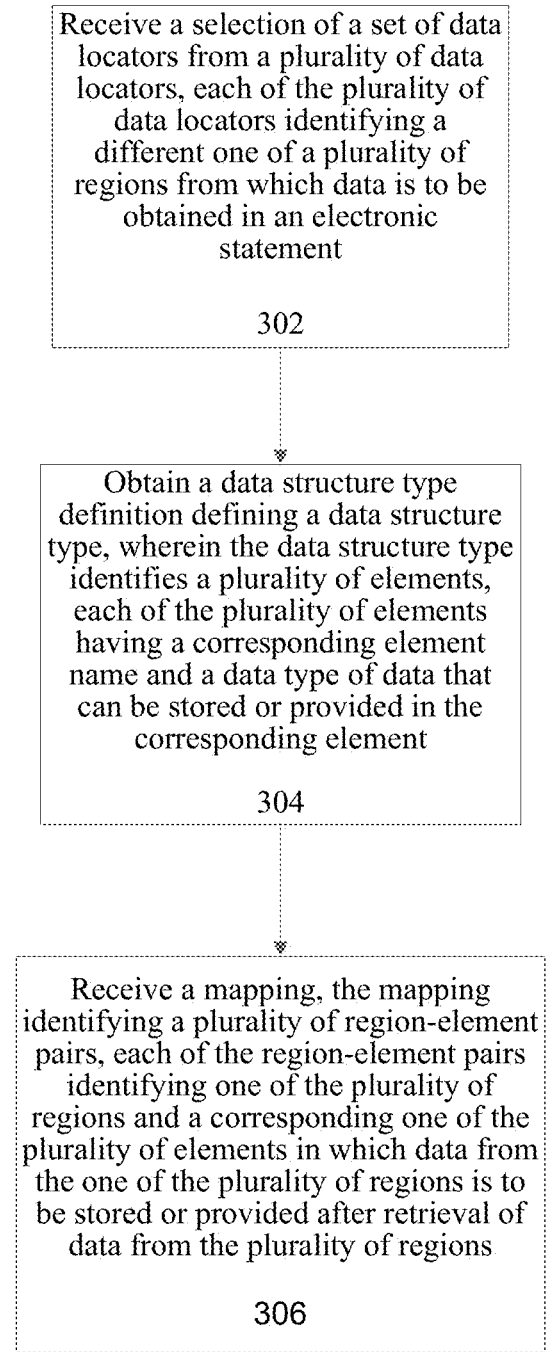
FIG. 3 is a process flow diagram illustrating an example method of configuring a system to retrieve data from an electronic statement and store the data for use in report generation in accordance with various embodiments.

Prior to retrieving data as described above with reference to FIG. 2, the system may be configured for the retrieval of data from an electronic statement and storage of the data that has been retrieved. FIG. 3 is a process flow diagram illustrating an example method of configuring a data retrieval system to retrieve data from an electronic statement and store the data for use in report generation in accordance with various embodiments. An individual such as an Information Technology (IT) professional may configure the system with one or more rule(s) (i.e., data locators) to enable data from an electronic statement of a particular statement type (e.g., bank statement) to be identified and retrieved. Thus, a selection of a set of data locators from a plurality of data locators may be received at 302, where each of the plurality of data locators identifies a different one of a plurality of regions of an electronic statement from which data is to be obtained.

In addition, an individual such as an IT professional may configure the system to store the data retrieved from an electronic statement in a data structure having a particular data structure type. This may be accomplished by obtaining a data structure type definition defining a data structure type at 304, where the data structure type identifies a plurality of elements. For example, a data structure type definition may be obtained in response to a selection of one of a plurality of data structure types or corresponding definitions, enabling a document data structure conforming to the selected one of the plurality of data structure types to be generated. As another example, a data structure type definition may be obtained by receiving a data structure type definition via a user interface such that the plurality of elements of the data structure type are individually identified in response to input received via a user interface. Each of the plurality of elements may be identified by a corresponding element name, and may also have a data type of data that can be stored in the corresponding element.

An individual such as an IT professional may further define a mapping between regions (e.g., data fields) of an electronic statement from which data is to be retrieved and corresponding elements of the document data structure in which the data is to be stored. More particularly, a mapping may be received at 306, where the mapping identifies a plurality of region-element pairs, where each of the region-element pairs identifies one of the plurality of regions (e.g., fields) and a corresponding one of the plurality of elements in which data from the one of the plurality of regions is to be stored after retrieval of data from the corresponding one of the plurality of regions.

As described above, the data for the plurality of regions of an electronic document that has been obtained from an intermediate data structure may be stored using a document data structure. More particularly, the set of data locators identified at 302 may be used to obtain the data for the plurality of regions from the intermediate data structure. A document data structure conforming to the data structure type identified at 304 may be generated. For example, a class corresponding to the data structure type may be instantiated in an object-oriented language to generate an object of the data structure type. The data that has been retrieved for the plurality of regions of the electronic statement may be stored or provided in the plurality of elements of the document data structure according to the mapping established at 306. Once the data has been stored or provided in the document data structure, at least a portion of the data may be obtained from the document data structure, enabling a report to be generated from a report design using the at least a portion of the data.

Figure 4:
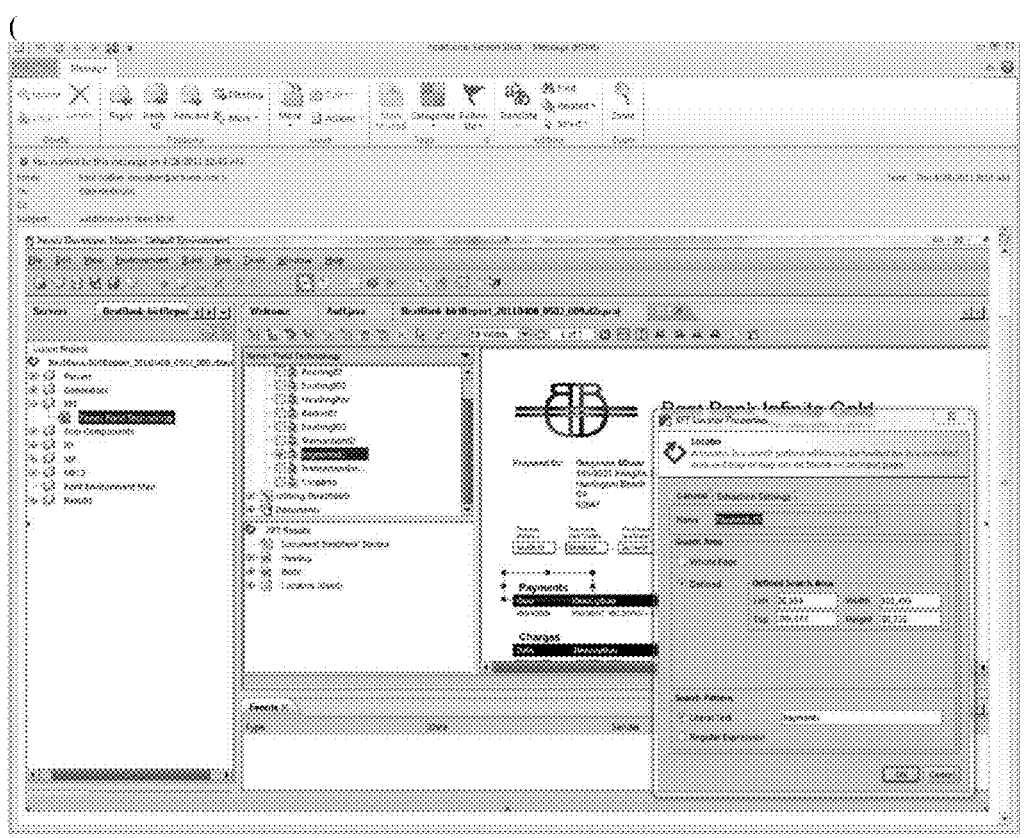
FIG. 4 is a screen shot illustrating an example graphical user interface that may be used to select a set of locators for use in retrieving data from an electronic statement as described at 302 of FIG. 3 in accordance with various embodiments.

FIG. 4 is a screen shot illustrating an example graphical user interface that may be used to select a set of locators for use in retrieving data from an electronic statement as described at 302 of FIG. 3 in accordance with various embodiments. The set of data locators may together represent business logic implemented to generate a particular statement format. More particularly, an electric bill generated by an electric company will generally have a different format from a credit card bill generated by a credit card company. In fact, each credit card company may use a different format when generating their credit card statements. Each of these different formats may be defined by different sets of data fields in various different positions. Therefore, a different set of data locators may be implemented for each of these different statement formats or document types in order to identify a corresponding set of regions (e.g., data fields) in their respective locations. The type of document may be any form of printable document that contains encoded text and/or images and has a consistent repeating logical structure or layout across many instances of that document type.

One or more of the set of data locators may each indicate a static location or floating location of a corresponding one of the plurality of regions of an electronic statement from which data is to be obtained. A static location may be defined by horizontal and vertical coordinates and/or horizontal and vertical dimensions. A floating location may be defined by a name of a field and/or a search pattern that is to be searched for within a particular electronic document.

As shown in FIG. 4, a locator may be defined by a name (e.g. PaymentsID). In addition, the locator may indicate a particular search area. In this example, the search area may be an entire document or page, or may be a particular specified area within the document or page. In this example, a "Whole Page" option may be selected to indicate that the search area is the entire page (or document). Alternatively, a particular search area may be defined by a Width and Height, beginning at a particular point defined by a Left coordinate and Top coordinate. A search pattern may be defined by literal text including one or more characters or words (e.g., Payments), or by a regular expression.

Locators may be defined to search for various fields or sections within an electronic document. In this example, the locator is used to identify a "Payments" section within the electronic document. Other examples of locators include "Transaction ID," "Corporate Information," "Header," and "Footer."

Figure 5:
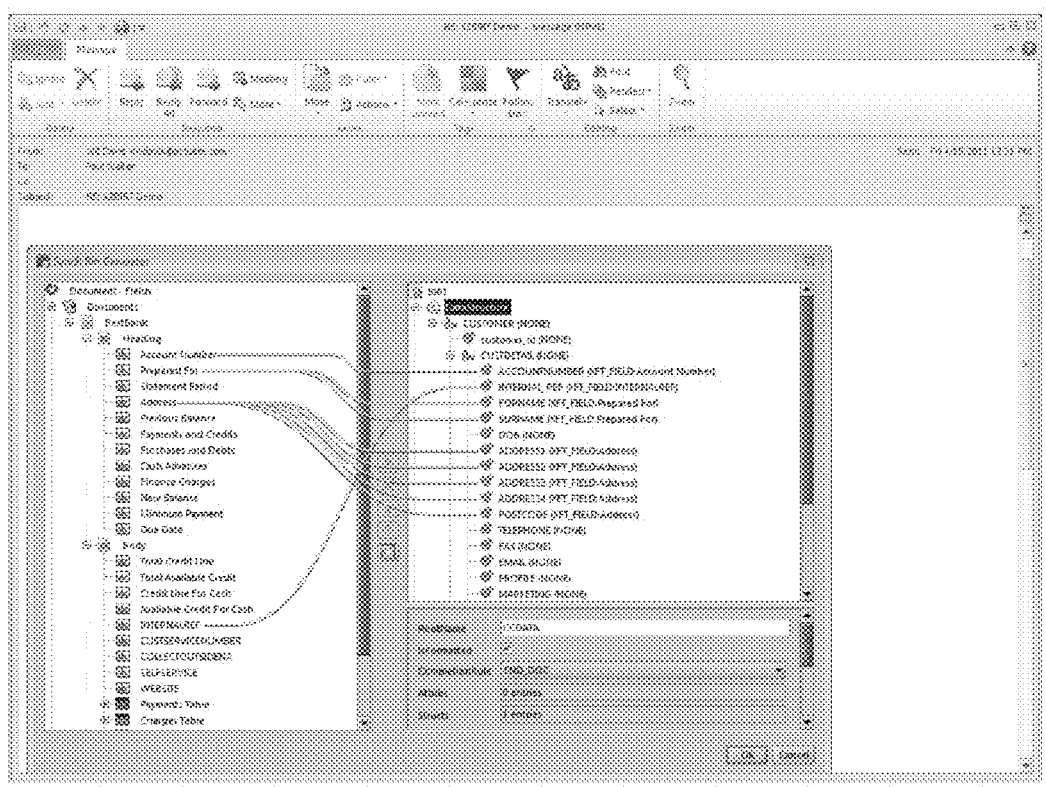
FIG. 5 is a screen shot illustrating an example graphical user interface that may be used to select a data structure for use in storing data that has been retrieved from an electronic statement in accordance with various embodiments.

FIG. 5 is a screen shot illustrating an example graphical user interface that may be used to select a data structure for use in storing data that has been retrieved from an electronic statement in accordance with various embodiments. As shown in this example, a user such as an IT professional may generate a mapping that maps regions (e.g., fields) of an electronic statement of a particular statement type (e.g., bank statement) to elements of a data structure in which data from the regions of the electronic statement are to be stored. More particularly, the mapping identifies a plurality of region-element pairs, where each of the region-element pairs identifies one of the plurality of regions of the electronic statement and a corresponding one of the plurality of elements in which data from the one of the plurality of regions is to be stored after retrieval of data from the corresponding one of the plurality of regions.

As shown in this example, a plurality of document fields of a particular document type are illustrated at the left of the screen, while elements of a particular data structure type are illustrated at the right of the screen. Each region-element pair may be represented by a line connecting one of the document fields at the left of the screen with one of the elements of the data structure type at the right of the screen. For example, as shown in FIG. 5, the Account Number field may be mapped to an AccountNumber element of the data structure type. Similarly, a Prepared For field may be mapped to Forname and Surname elements of the data structure type. For each document, a data structure of the data structure type may be instantiated for storing of data retrieved from the corresponding document. Therefore, each document data structure may identify a customer and/or account number. Therefore, the document data structure(s) that are pertinent to a particular user request may be identified, at least in part, through ensuring that the document data structure is associated with the user submitting a request for a report.

As described above, in order for data to be "retrieved" from electronic statement(s), the data may be stored or provided in corresponding document data structure(s). However, from the perspective of a user generating a report, the electronic statement(s) may be perceived as a distinct data source. In accordance with various embodiments, a data source may be defined to enable a user to access this "data source."

In accordance with various embodiments, a virtual data source may be defined to refer to a data structure or set of data structures. For example, the data source may be defined to identify a set of document data structures. Alternatively, a data source may be defined to refer to a process (e.g., set of computer-readable instructions). For example, the process may include a method of retrieving data from one or more electronic statements. As another example, the process may include a method of retrieving data from one or more electronic statements and storing the data in one or more corresponding document data structures. In this manner, a set of electronic statements may be perceived by a user as a distinct data source.

Figure 6:
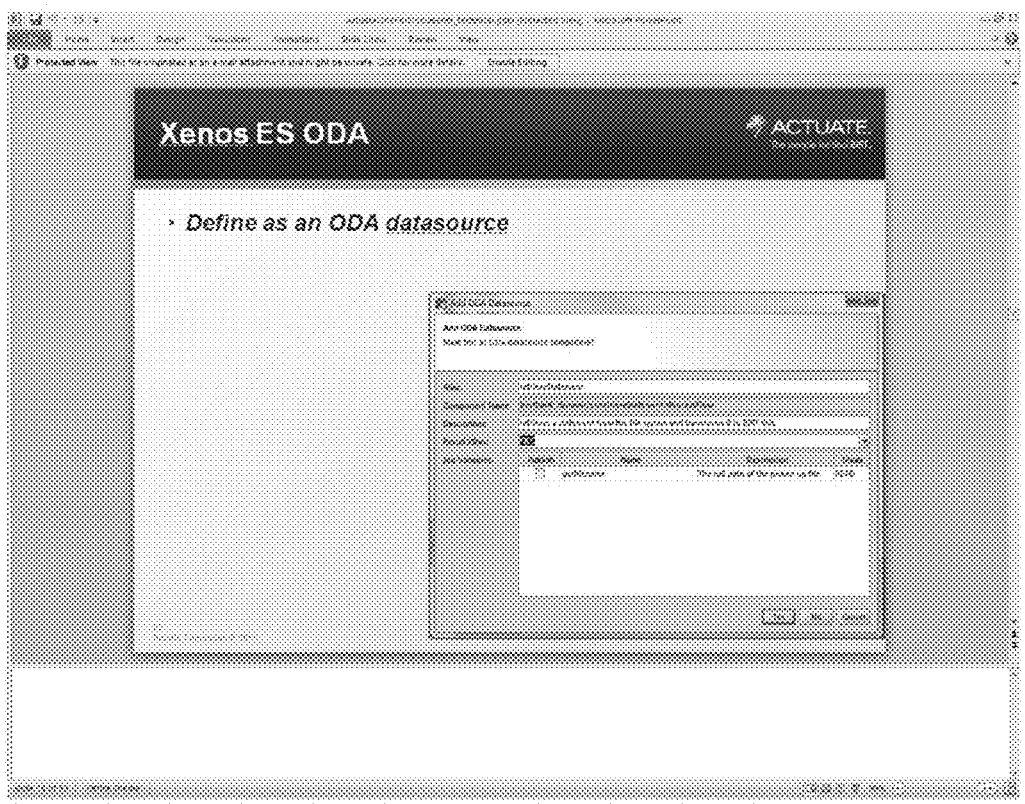
FIG. 6 is a screen shot illustrating an example graphical user interface that may be used to define a data source in accordance with various embodiments.

FIG. 6 is a screen shot illustrating an example graphical user interface that may be used to define a data source in accordance with various embodiments. A user such as an IT professional may configure one or more data sources via a graphical user interface such as that shown in FIG. 6. In this example, a data source is defined as "retrieveStatement," which identifies a particular process flow that retrieves data from one or more electronic statements and stores the data in one or more corresponding data structures. For example, the data structures may be implemented in XML. The process flow may be identified by a particular file or set of files by identifying a path name, as shown in this example.

Through the use of a data source definition, a virtual data source may be defined such that one or more document data structures can be accessed as a single data source. More particularly, a set of fields of the electronic statements (or elements of the document data structures) may be presented to the user for selection in report generation. In this manner, the user may perceive these fields (or elements) to correspond to data in the virtual data source, therefore enabling the user to submit a request to access data in one or more fields (or elements) of the data source. More particularly, a user may generate a report design identifying field(s) (or elements), enabling a report to be generated using at least a portion of the data in one or more electronic statements (or stored in the corresponding document data structures) while appearing to the user that has submitted the request that the data is being retrieved from a single data source defined by the fields (or elements) presented to the user for selection.

Once data has been obtained from electronic statement(s), the data may be accessed for use in report generation. The data that is accessed may pertain to a single customer, enabling a customer to generate a report based upon the customer's electronic statements. Alternatively, the data that is accessed may pertain to two or more customers. Therefore, the data may be accessed from one or more corresponding files or data structures (e.g., document data structures).

Figure 7:
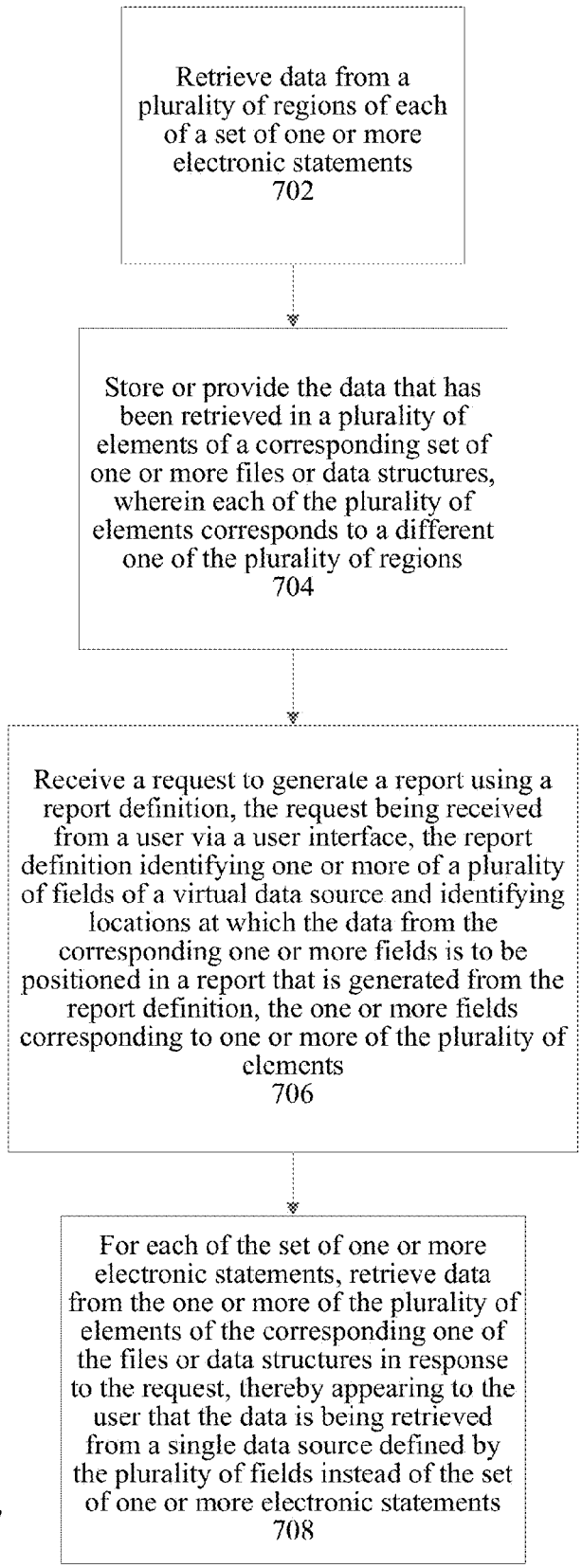
FIG. 7 is a process flow diagram illustrating an example method of generating a report using data that has been retrieved from one or more electronic statements in accordance with various embodiments.

FIG. 7 is a process flow diagram illustrating an example method of generating a report using data that has been retrieved from one or more electronic statements in accordance with various embodiments, where each of the electronic statements conforms to one of a plurality of print formats.

Data may be retrieved from a plurality of regions of each of a set of one or more electronic statements at 702. The data that has been retrieved may be stored or provided at 704 in a plurality of elements of a corresponding set of one or more files or data structures, wherein each of the plurality of elements corresponds to a different one of the plurality of regions.

A request to generate a report using a report definition may be received from a user via a user interface at 706. More particularly, the request may be received from the user via a web site after the user logs into the web site. The report definition may identify one or more of a plurality of fields of a virtual data source from which data is to be retrieved and identify locations at which the data from the corresponding one or more of the plurality of fields is to be positioned in a report that is generated from the report definition, where the one or more fields correspond to one or more of the plurality of elements. For example, a user interface may enable the user to select from the plurality of fields of the virtual database for use in a report definition. The names of the plurality of fields may be identical to the names of the plurality of elements and/or the plurality of regions.

For each of the set of one or more electronic statements, data may be retrieved at 708 from the one or more of the plurality of elements of the corresponding one of the files or data structures in response to the request, thereby appearing to the user that the data is being retrieved from a single data source defined by the plurality of fields, rather than the set of one or more electronic statements.

Figure 8:
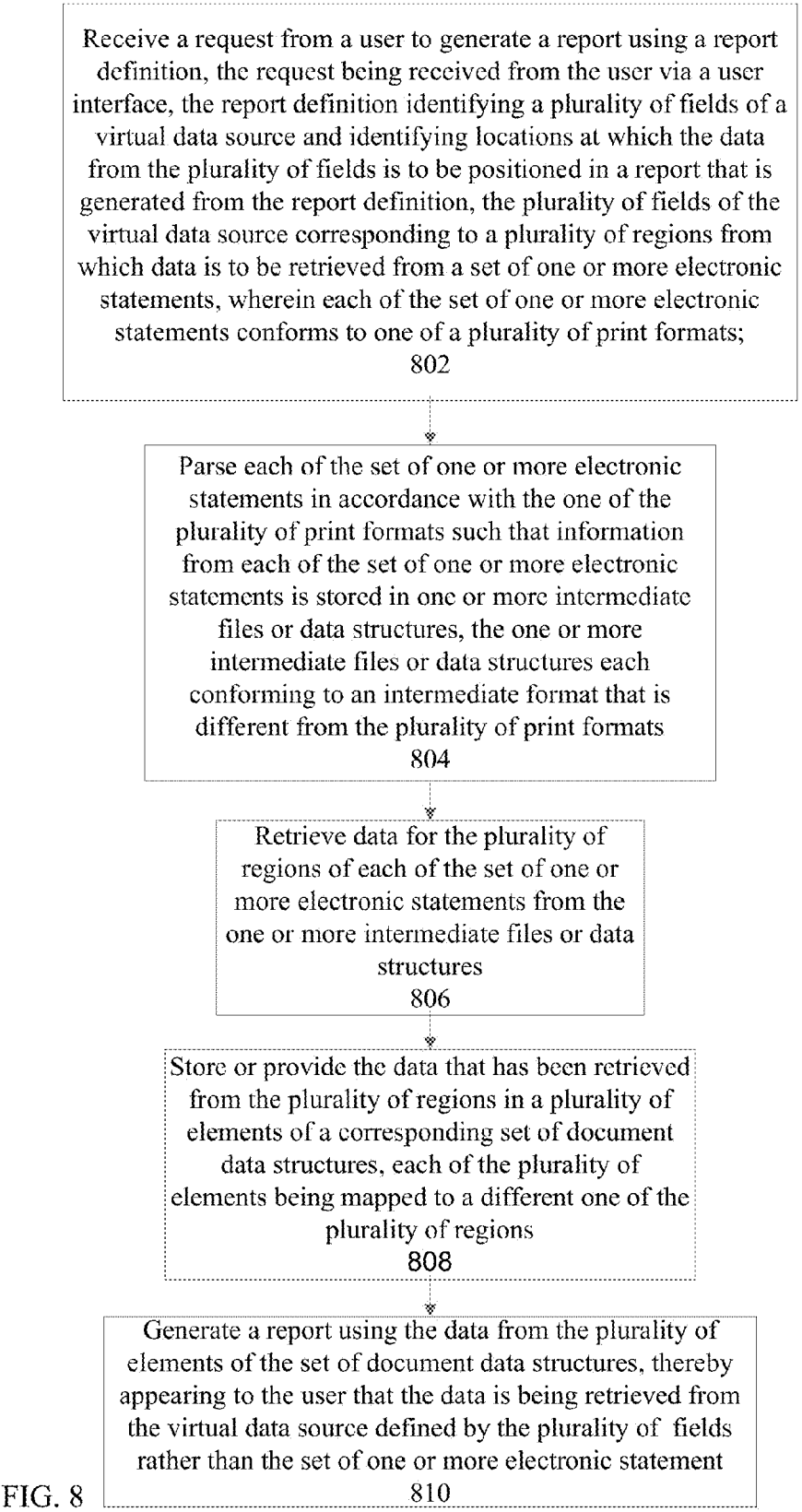
FIG. 8 is a process flow diagram illustrating an example method of generating a report from one or more electronic statements in accordance with various embodiments.

While data may be obtained from electronic statements prior to the generation of a report, it is also possible to dynamically obtain data from electronic statements in response to a request to generate a report. FIG. 8 is a process flow diagram illustrating an example method of generating a report from one or more electronic statements in accordance with various embodiments, where each of the electronic statements conforms to one of a plurality of print formats. A request to generate a report using a report definition may be received from a user via a user interface at 802. More particularly, the request may be received from the user via a web site after the user logs into the web site. The report definition may identify a plurality of fields of a virtual data source and locations at which the data from the plurality of fields is to be positioned in a report that is generated from the report definition, where the plurality of fields of the virtual data source correspond to a plurality of regions from which data is to be retrieved from a set of one or more electronic statements, wherein each of the set of one or more electronic statements conforms to one of a plurality of print formats.

Data may then be retrieved from the electronic statements in response to the request. More particularly, each of the set of one or more electronic statements may be parsed at 804 in accordance with the one of the plurality of print formats such that information from each of the set of one or more electronic statements is stored in one or more intermediate files or data structures. The one or more intermediate files or data structures may each conform to an intermediate format that is different from the plurality of print formats. Data may be retrieved at 806 for the plurality of regions of each of the set of one or more electronic statements from the one or more intermediate files or data structures. The data that has been retrieved from the plurality of regions may be stored or provided at 808 in a plurality of elements of a corresponding set of document data structures, each of the plurality of elements being mapped to a different one of the plurality of regions. A report may then be generated at 810 using the data from the plurality of elements of the set of document data structures, thereby appearing to the user that the data is being retrieved from the virtual data source defined by the plurality of fields rather than the set of one or more electronic statements.

An individual may submit a request for a report corresponding to a particular report design (and/or in accordance with specific criteria). The request may be received off-line or on-line. For instance, the individual may submit a request via a user interface coupled to a website suitable for generating and/or providing access to reports generated using data retrieved from electronic statements. In one embodiment, the individual may log in to his or her account via the website in order to generate, view or otherwise obtain a report based upon electronic statement(s) from his or her account. Thus, the request may indicate an identity of the individual associated with the electronic statement(s). Upon receiving the request, the report may be generated and provided to the individual in real-time (e.g., by providing an electronic version such as a PDF of the report for viewing or downloading) or at a later time (e.g., via postal mail). The generation and/or providing of the report may be performed automatically, or upon initiation by a user (e.g., the individual).

Data may be retrieved from one or more electronic statements on an as-needed basis on demand in response to a request from an individual. Alternatively, data may be retrieved from a plurality of electronic statements as a batch process (e.g., to generate a plurality of intermediate data structures and/or document data structures). The retrieved data may be stored for later retrieval (e.g., in the form of intermediate data structures and/or document data structures). More particularly, a report may be generated based upon the retrieved data in response to a request from an individual, as set forth above.

Figure 9:
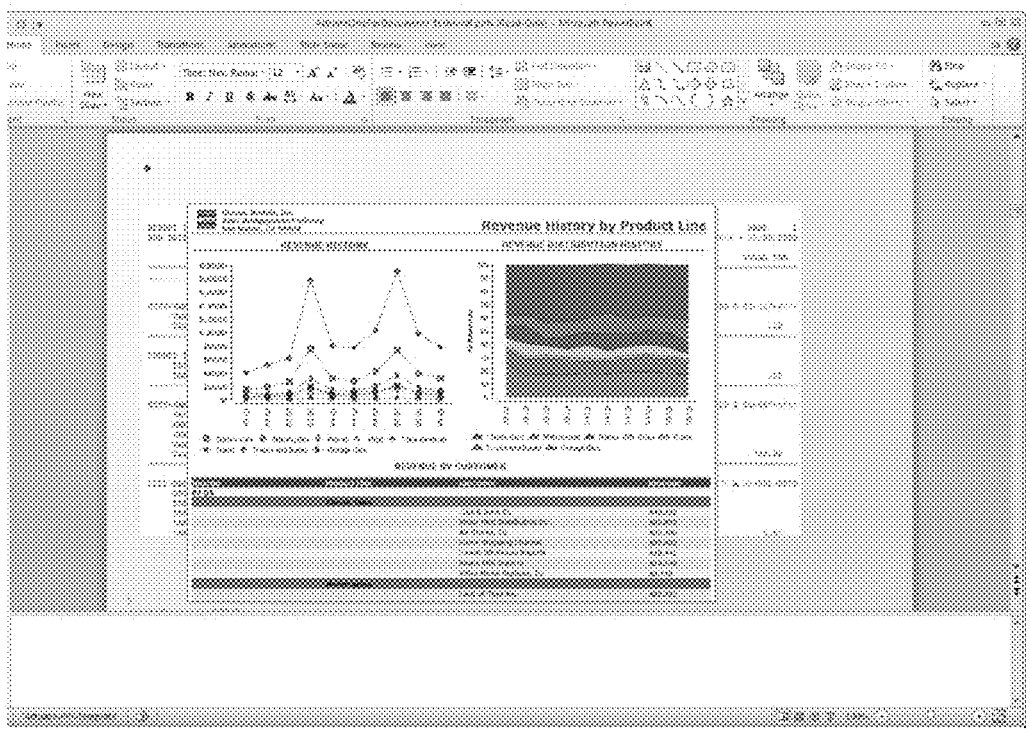
FIG. 9 is a diagram illustrating an example report that may be generated using data that has been retrieved from one or more electronic statements.

FIG. 9 is a diagram illustrating an example report that may be generated using data that has been retrieved from one or more electronic statements. A report may include a presentation of data in a particular format in accordance with a report design. The report may provide a static representation of data. Alternatively, the report may provide a dynamic representation of data, enabling a user to interact with the report and modify the format of the presentation of the data via a graphical user interface. As shown in this example, the report may be presented in a variety of formats, including spreadsheets, graphs, charts, dashboards, etc. A report may be generated using a particular report design. The report design may be selected automatically, or in response to user input. In addition, a report design may be customized and generated by a user through the use of a graphical user interface enabling the user to select fields of the electronic statement (or virtual data source) that are pertinent to a report generated from the report design, as well as placement of each of the fields within the report.

A user may wish to generate a report based upon statements received over a period of time (e.g., years). For example, the user may be interested in the balance (e.g., New Balance field) specified in the statements over a specified period of time (e.g., by specifying a date range of January, 2005 through January, 2010. Through the use of a report design that identifies the New Balance field and a date range, the user may generate a report such as a chart that illustrates the change in the amount of the balance over the specified period of time. It is important to note that such a report may be generated using data in the statements, even though the statements are stored in a print format that is incompatible with conventional report generation tools.

The disclosed embodiments may be used advantageously by companies to provide access to data formatted for a printer in high volume documents such as electronic statements. Therefore, organizations may capture data from high-volume print streams and offer the data in the form of a virtual data source for use in report generation. By enabling data in high-volume print streams to be accessed as a virtual data source, organizations can gain a competitive advantage by offering access to data that would otherwise be unavailable. Moreover, the ability to access data in print streams in periodic summary statements eliminates the need for these organizations to continue to store data that is summarized in the statements.

Figure 10:
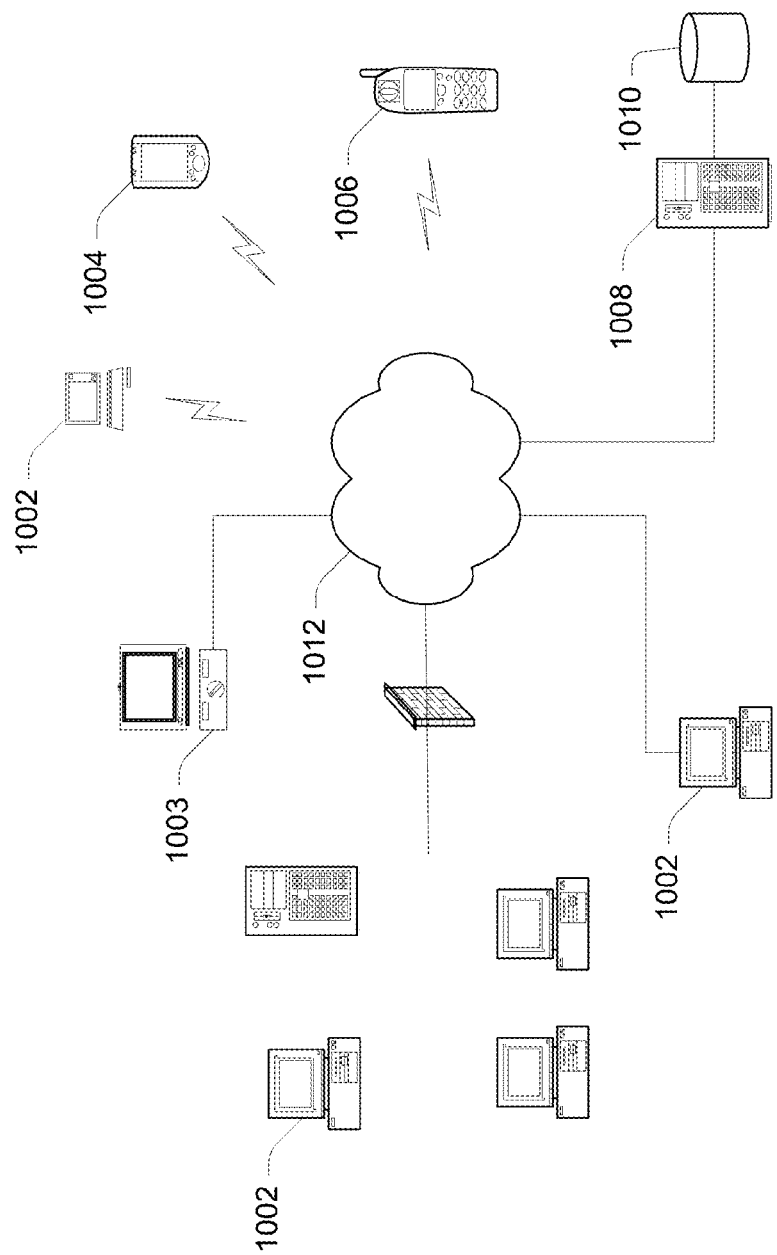
FIG. 10 is a diagram illustrating an example system in which various embodiments may be implemented.

Embodiments of the present invention may be employed to access print streams such as electronic statements for use in report generation in any of a wide variety of computing contexts. For example, as illustrated in FIG. 10, implementations are contemplated in which the relevant population of users interact with a diverse network environment via any type of computer (e.g., desktop, laptop, tablet, etc.) 1002, media computing platforms 1003 (e.g., cable and satellite set top boxes and digital video recorders), handheld computing devices (e.g., PDAs) 1004, cell phones 1006, or any other type of computing or communication platform.

A report may be generated or accessed according to the invention in some centralized manner. This is represented in FIG. 10 by server 1008 and data store 1010 which, as will be understood, may correspond to multiple distributed devices and data stores. The invention may also be practiced in a wide variety of network environments (represented by network 1012) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques of the present invention may be implemented in any suitable combination of software and/or hardware system, such as a web-based server or desktop computer system. The apparatus of this invention may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The program instructions may be implemented in an object-oriented language such as C++ or Java. The memory or memories may also be configured to store electronic documents such as electronic statements, intermediate data structures storing information from electronic statements, document data structures storing data obtained from the intermediate data structures, reports that have been generated using data obtained from the electronic statements, computer-readable instructions for enabling a user to establish configurations via a graphical user interface, computer-readable instructions for retrieving data from electronic statements as described herein, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 11:
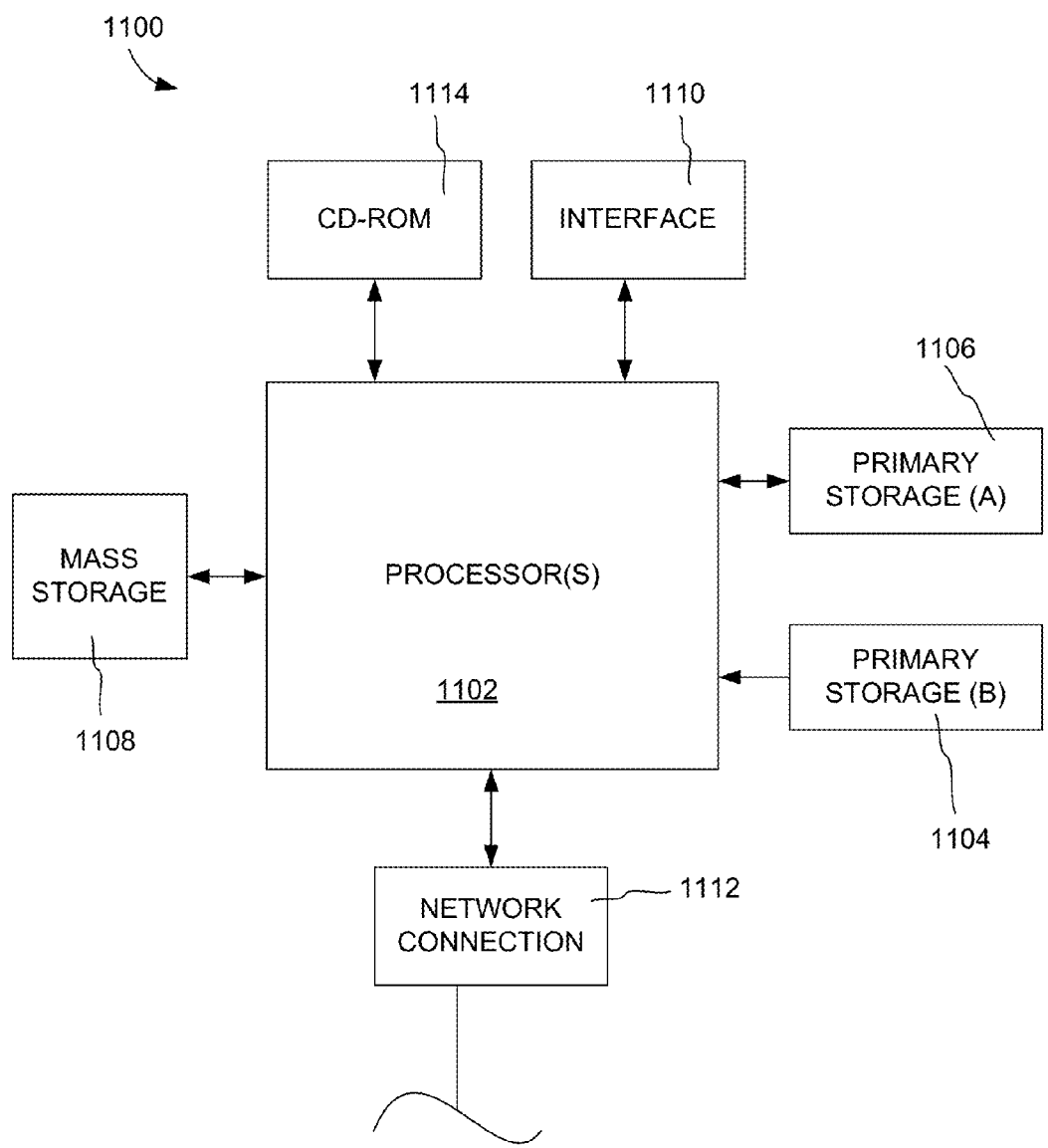
FIG. 11 illustrates an example computer system via which various embodiments may be implemented.

FIG. 11 illustrates a typical computer system that, when appropriately configured or designed, can serve as a system of this invention. The computer system 1100 includes any number of processors 1102 (also referred to as central processing units, or CPUs) that are coupled to storage devices including primary storage 1106 (typically a random access memory, or RAM), primary storage 1104 (typically a read only memory, or ROM). CPU 1102 may be of various types including microcontrollers and microprocessors such as programmable devices (e.g., CPLDs and FPGAs) and unprogrammable devices such as gate array ASICs or general purpose microprocessors. As is well known in the art, primary storage 1104 acts to transfer data and instructions uni-directionally to the CPU and primary storage 1106 is used typically to transfer data and instructions in a bi-directional manner. Both of these primary storage devices may include any suitable computer-readable media such as those described above. A mass storage device 1108 is also coupled bi-directionally to CPU 1102 and provides additional data storage capacity and may include any of the computer-readable media described above. Mass storage device 1108 may be used to store programs, data and the like and is typically a secondary storage medium such as a hard disk. It will be appreciated that the information retained within the mass storage device 1108, may, in appropriate cases, be incorporated in standard fashion as part of primary storage 1106 as virtual memory. A specific mass storage device such as a CD-ROM 1114 may also pass data uni-directionally to the CPU.

CPU 1102 may also be coupled to one or more interfaces 1110 that connect to one or more input/output devices such as such as video monitors, track balls, mice, keyboards, microphones, touch-sensitive displays, transducer card readers, magnetic or paper tape readers, tablets, styluses, voice or handwriting recognizers, speakers, accessibility devices such as speech synthesizers (i.e., readers) or Braille devices, or other well-known input devices such as, of course, other computers. Finally, CPU 1102 optionally may be coupled to an external device such as a database or a computer or telecommunications network using an external connection as shown generally at 1112. With such a connection, it is contemplated that the CPU might receive a user request or information such as an electronic statement from the network, or might output information to the network in the course of performing the method steps described herein.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, comprising:
    obtaining an electronic document conforming to one of a plurality of print formats;
    parsing the electronic document according to the one of the plurality of print formats to generate an intermediate data structure conforming to an intermediate format such that the electronic document is converted to the intermediate format, wherein the intermediate format is different from the plurality of print formats;
    applying one or more rules to obtain data for a plurality of regions of the electronic document from the intermediate data structure; and
    storing or providing the data for the plurality of regions of the electronic document that has been obtained from the intermediate data structure, thereby enabling a report to be generated using at least a portion of the data for the plurality of regions that has been stored or provided.

2. The method as recited in claim 1, further comprising:
    identifying the one of the plurality of print formats to which the electronic document conforms;
    wherein parsing comprises applying one of a plurality of parsers to parse the electronic document, wherein the one of the plurality of parsers is configured to parse documents in the one of the plurality of print formats;
    wherein each of the plurality of parsers is configured to parse documents in a different one of the plurality of print formats.

3. The method as recited in claim 1, wherein applying one or more rules comprises: identifying the plurality of regions of the electronic document according to the one or more rules; and
    obtaining data for the plurality of regions from the intermediate data structure.

4. The method as recited in claim 1, wherein each of the one or more rules identifies a static or floating location in the electronic document at which data is to be obtained for one of the plurality of regions, and wherein the intermediate data structure indicates the static or floating location for the corresponding one of the plurality of regions from which data is to be obtained.

5. The method as recited in claim 1, wherein at least one of the one or more rules includes a search pattern to be identified in the electronic document, and wherein the intermediate data structure includes the search pattern.

6. The method as recited in claim 1, wherein storing or providing the data for the plurality of regions of the electronic document that has been obtained from the intermediate data structure comprises:
    generating a document data structure that contains the data for the plurality of regions of the electronic document.

7. The method as recited in claim 6, further comprising:
    receiving a request to obtain data for a subset of the plurality of regions;
    retrieving data for the subset of the plurality of regions from the document data structure; and
    generating a report using at least a portion of the data that has been retrieved in response to the request.

8. The method as recited in claim 7, wherein the request is received from a report generation tool, wherein the subset of the plurality of regions are identified by the report generation tool as pertinent to a report design.

9. The method as recited in claim 6, further comprising:
    storing the data from the document data structure in a data structure, file or database.

10. The method as recited in claim 6, further comprising:
receiving a selection of one of a plurality of data structure types prior to generating the document data structure, wherein the document data structure conforms to the selected one of the plurality of data structure types.

11. A method, comprising:
identifying one of a plurality of print formats to which an electronic statement conforms;
parsing the electronic statement by applying one of a plurality of parsers, wherein the one of the plurality of parsers is configured to parse documents in the one of the plurality of print formats, wherein each of the plurality of parsers is configured to parse documents in a different one of the plurality of print formats;
generating an intermediate data structure that stores information obtained by the one of the plurality of parsers, the intermediate data structure conforming to an intermediate format that is different from the plurality of print formats;
obtaining data for a plurality of regions of the electronic statement in the particular statement format by retrieving the data for the plurality of regions from the intermediate data structure; and
providing the data that has been retrieved for the plurality of regions of the electronic statement.

12. The method as recited in claim 11,
applying a set of data locators to obtain data for a plurality of regions of the electronic statement in the particular statement format by retrieving the data for the plurality of regions from the intermediate data structure; and
generating a document data structure;
wherein the data that has been retrieved for the plurality of regions of the electronic statement is provided in a plurality of elements of the document data structure according to a mapping.

13. The method as recited in claim 12, wherein the set of data locators together represent business logic implemented to generate a particular statement format.

14. The method as recited in claim 12, further comprising:
obtaining at least a portion of the data from the document data structure; and
generating a report from a report design using the at least a portion of the data.

15. The method as recited in claim 14, wherein generating the report is performed in response to a request received from a user, and wherein obtaining at least a portion of the data from the document data structure is performed in response to a request from a report generation module responsible for generating the report from the report design.

16. The method as recited in claim 15, wherein the document data structure identifies the user.

17. The method as recited in claim 16, wherein the request received from the user is received via a web site after the user logs into the web site.

18. The method as recited in claim 15, wherein the report generation module identifies a subset of the plurality of regions that are pertinent to the report design, wherein the request from the report generation module responsible for generating the report from the report design identifies the subset of the plurality of regions that are pertinent to the design, wherein the data is obtained from the subset of the plurality of regions from the document data structure in response to the request from the report generation module.

19. The method as recited in claim 12, wherein the a plurality of document data structures are generated for a plurality of electronic statements, wherein each of the plurality of document data structures stores or includes data obtained for the plurality of regions from a different one of the plurality of electronic statements.

20. The method as recited in claim 19, further comprising:
generating a report using at least a portion of data from at least a portion of the plurality of document data structures.

21. The method as recited in claim 20, wherein the plurality of electronic statements are associated with a plurality of customers, wherein the at least a portion of the plurality of document data structures are associated with a single one of the plurality of customers.

22. The method as recited in claim 20, wherein the plurality of electronic statements are associated with a plurality of customers, wherein the at least a portion of the plurality of document data structures are associated with two or more of the plurality of customers.

23. The method as recited in claim 12, further comprising:
obtaining a data structure type definition defining a data structure type, wherein the data structure type identifies a plurality of elements, each of the plurality of elements having a corresponding element name and a data type of data that can be stored or provided in the corresponding element;
wherein the document data structure conforms to the data structure type;
wherein obtaining a data structure type definition comprises obtaining a selection of one of a plurality of data structure type definitions or receiving the data structure type definition via a user interface.

24. The method as recited in claim 23, wherein obtaining a data structure type definition comprises receiving the data structure type definition via a user interface such that the plurality of elements of the data structure type are individually identified in response to input received via a user interface.

25. The method as recited in claim 12, wherein one or more of the set of data locators each indicate a static or floating location of a corresponding one of the plurality of regions from which data is to be obtained.

26. The method as recited in claim 11, further comprising:
identifying the one of the plurality of print formats to which the electronic statement conforms in response to input from a user.

27. The method as recited in claim 11, wherein identifying the one of the plurality of print formats to which the electronic statement conforms is performed in response to a selection of one of the plurality of print formats.

28. A non-transitory computer-readable medium storing thereon computer-readable instructions, comprising:
instructions for obtaining one or more electronic documents conforming to one of a plurality of print formats;
instructions for parsing each of the one or more electronic documents to obtain data from the one or more electronic documents according to the one of the plurality of print formats;
instructions for storing the data that has been obtained from the one or more electronic documents in one or more intermediate data structures that conform to an intermediate format, wherein the intermediate format is different from the plurality of print formats;
instructions for applying one or more rules to retrieve data for a plurality of regions of the electronic documents from the one or more intermediate data structures;
instructions for storing or providing the data for the plurality of regions using one or more document data structures;

instructions for defining a data source such that the one or more document data structures can be accessed as a single data source in response to a request to access data in the one or more electronic documents, thereby enabling a report to be generated using at least a portion of the data in the one or more document data structures while appearing to a user that has submitted the request that the at least a portion of the data is being retrieved from the one or more electronic documents.

29. The non-transitory computer-readable medium as recited in claim 28, wherein the data source is defined to comprise the instructions for obtaining one or more electronic documents, instructions for parsing each of the one or more electronic documents, instructions for storing the data that has been obtained from the one or more electronic documents in one or more intermediate data structures, instructions for applying one or more rules, and instructions for storing or providing the data for the plurality of regions in one or more document data structures.

30. The non-transitory computer-readable medium as recited in claim 28, wherein the data source is defined using a mapping between the plurality of regions of the electronic documents and a plurality of elements of the document data structures.

31. A method, comprising:

retrieving data from a plurality of regions of each of a set of one or more electronic statements;

storing or providing the data that has been retrieved in a plurality of elements of a corresponding set of one or more files or data structures, wherein each of the plurality of elements corresponds to a different one of the plurality of regions;

receiving a request to generate a report using a report definition, the request being received from a user via a user interface, the report definition identifying one or more of a plurality of fields of a virtual data source and identifying locations at which the data from the corresponding one or more of the plurality of fields is to be positioned in a report that is generated from the report definition, the one or more fields corresponding to one or more of the plurality of elements; and for each of the set of one or more electronic statements, retrieving data from the one or more of the plurality of elements of the corresponding one of the files or data structures in response to the request, thereby appearing to the user that the data is being retrieved from a single data source defined by the plurality of fields instead of the set of one or more electronic statements;

wherein each of the set of one or more electronic statements conforms to one of a plurality of print formats.

32. A method, comprising:

receiving a request from a user to generate a report using a report definition, the request being received from the user via a user interface, the report definition identifying a plurality of fields of a virtual data source and identifying locations at which the data from the plurality of fields is to be positioned in a report that is generated from the report definition, the plurality of fields of the virtual data source corresponding to a plurality of regions from which data is to be retrieved from a set of one or more electronic statements, wherein each of the set of one or more electronic statements conforms to one of a plurality of print formats;

parsing each of the set of one or more electronic statements in accordance with the one of the plurality of print formats such that information from each of the set of one or more electronic statements is stored in one or more intermediate files or data structures, the one or more intermediate files or data structures each conforming to an intermediate format that is different from the plurality of print formats;

retrieving data for the plurality of regions of each of the set of one or more electronic statements from the one or more intermediate files or data structures;

storing or providing the data that has been retrieved from the plurality of regions in a plurality of elements of a corresponding set of document data structures, each of the plurality of elements being mapped to a different one of the plurality of regions; and generating a report using the data from the plurality of elements of the set of document data structures, thereby appearing to the user that the data is being retrieved from the virtual data source defined by the plurality of fields rather than the set of one or more electronic statements.

* * * * *